(12) United States Patent
Reguzzi

(10) Patent No.: US 7,422,099 B2
(45) Date of Patent: Sep. 9, 2008

(54) ENDLESS CHAIN FOR CONVEYING PANELS AND THE LIKE TO BE PROCESSED

(75) Inventor: Luigi Reguzzi, Perticato di Mariano Comense (IT)

(73) Assignee: RE.M S.r.l., Como (IT)

( * ) Notice: Subject to any disclaimer, the term of this patent is extended or adjusted under 35 U.S.C. 154(b) by 107 days.

(21) Appl. No.: 11/483,474

(22) Filed: Jul. 10, 2006

(65) Prior Publication Data

US 2007/0023260 A1    Feb. 1, 2007

(30) Foreign Application Priority Data

Jul. 26, 2005    (IT)    ............... MI2005A1448

(51) Int. Cl.
*B65G 23/18*    (2006.01)
(52) U.S. Cl. ................................ 198/805
(58) Field of Classification Search ............ 198/805
See application file for complete search history.

(56) References Cited

U.S. PATENT DOCUMENTS

| 5,054,601 | A | * | 10/1991 | Sjogren et al. | ......... 198/370.04 |
| 5,295,568 | A | * | 3/1994 | Saito et al. | ................ 198/330 |
| 5,947,361 | A | * | 9/1999 | Berger et al. | ................ 226/92 |
| 5,975,277 | A | * | 11/1999 | Skarlupka | ............ 198/370.04 |
| 6,189,702 | B1 | * | 2/2001 | Bonnet | .................... 209/651 |
| 6,298,975 | B1 | * | 10/2001 | Fortenbery et al. | ..... 198/370.03 |
| 6,536,583 | B2 | * | 3/2003 | Luigi | ....................... 198/832 |
| 6,607,073 | B2 | * | 8/2003 | Buchi et al. | ............... 198/805 |

* cited by examiner

*Primary Examiner*—Mark A Deuble
(74) *Attorney, Agent, or Firm*—James V. Costigan; Hedman & Costigan, P.C.

(57) ABSTRACT

An endless chain for conveying panels and the like to be processed comprises a link chain entrained in a closed loop pattern about entrainment means and being coupled to chain driving means including a linear motor controlled by a control encoder for controlling the link chain movements.

2 Claims, 7 Drawing Sheets

ENDLESS CHAIN FOR CONVEYING PANELS AND THE LIKE TO BE PROCESSED

BACKGROUND OF THE INVENTION

The present invention relates to an endless chain for conveying panels and the like to be processed.

Endless conveyors for conveying panels and articles in general to processing stations therefor are already known.

However, prior panel conveyors are affected by the problem that they are not always adapted to provide a necessary conveying accuracy.

For overcoming the above problem it is conventionally provided to associate with the conveyor a plurality of control elements, designed for monitoring the locating precision of the workpiece being processed.

Another problem affecting prior conveyors is that the conveyor is subjected, in its operation, to vibrations and transmission clearances, which negatively affect the working accuracy and speed.

SUMMARY OF THE INVENTION

Accordingly, the aim of the present invention is to overcome the above mentioned problems by providing an endless chain for conveying panels and like products to be processed, allowing to always provide a very accurate conveying of the panels without clearances and vibrations, to allow the panels to be always precisely located.

Within the scope of the above mentioned aim, a main object of the invention is to disclose such an endless chain, constituting an integrating portion of the conveying means, adapted to provide a high processing accuracy and conveying speed.

Another object of the present invention is to provide such an endless chain which is very reliable and safe in operation.

Yet another object of the present invention is to provide such an endless chain for conveying panels and like products to be processed, which can be easily made and which, moreover, is very competitive from a mere economic standpoint.

According to one aspect of the present invention, the above mentioned aim and objects, as well as yet other objects, which will become more apparent hereinafter, are achieved by an endless chain for conveying panels to be processed, comprising an endless loop link chain coupled to endless loop link chain driving means, characterized in that said driving means comprise a linear motor driven by an encoder controlling the movements of said endless loop link chain.

BRIEF DESCRIPTION OF THE DRAWINGS

Further characteristics and advantages of the present invention will become more apparent hereinafter from the following detailed disclosure of a preferred embodiment of an endless chain for conveying panels and the like to be processed, which is illustrated, by way of an indicative, but not limitative example, in the accompanying drawings, where.

DESCRIPTION OF THE PREFERRED EMBODIMENT

Figure 1:
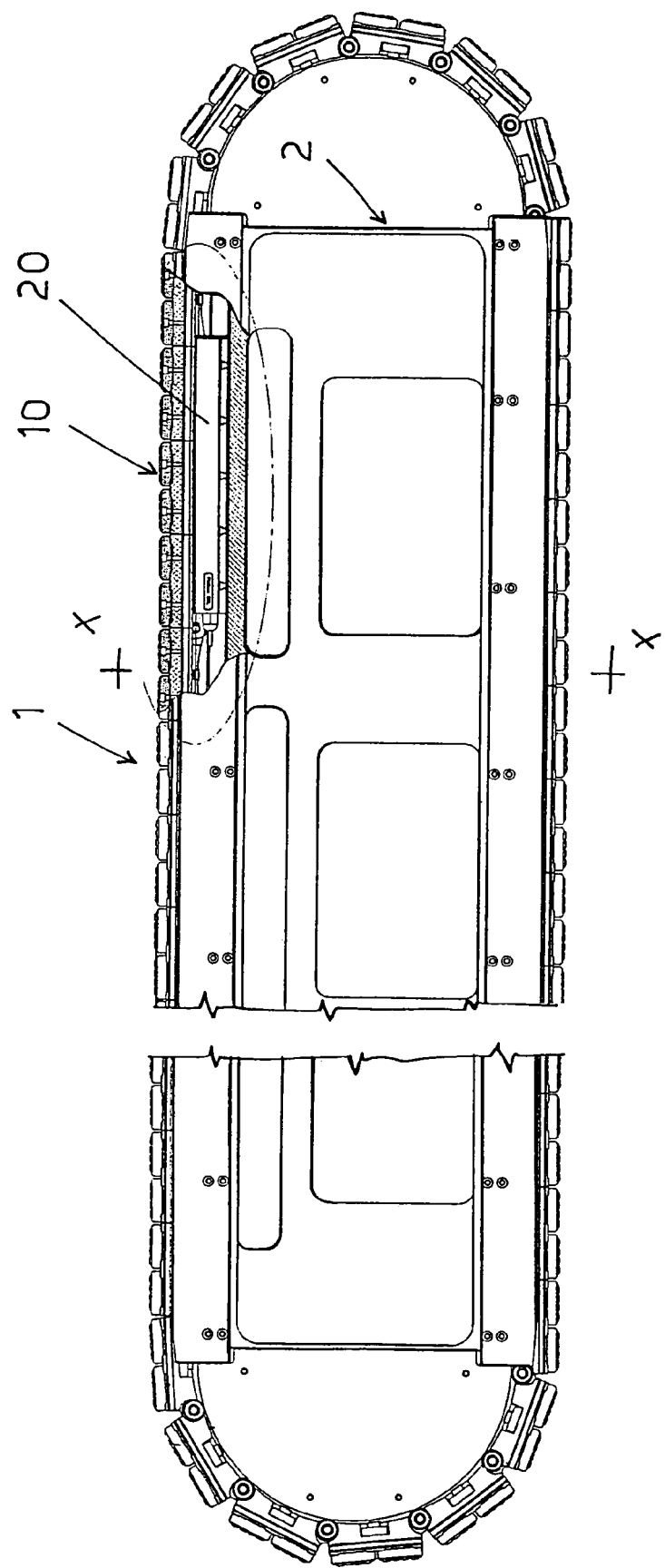
FIG. 1 is a schematic partially broken-away view showing the endless chain according to the invention.
Figure 2:
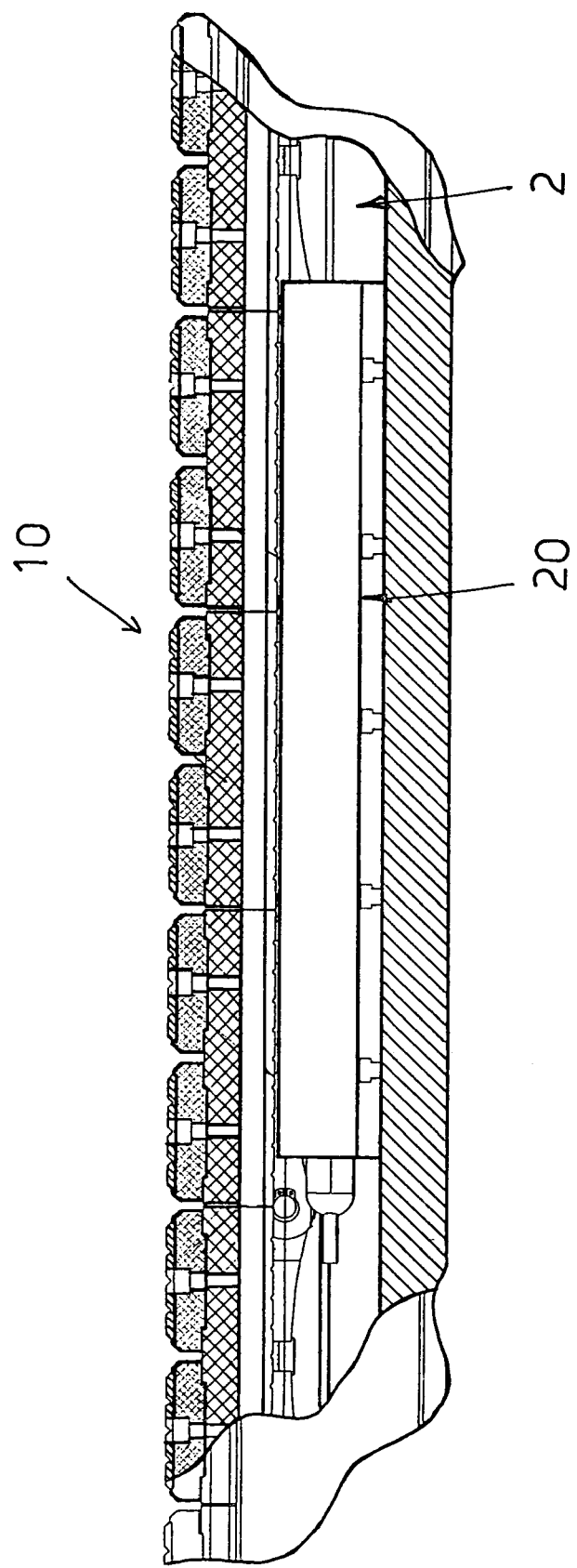
FIG. 2 shows, on an enlarged scale, a detail of the linear motor driving the endless chain according to the invention.
Figure 3:
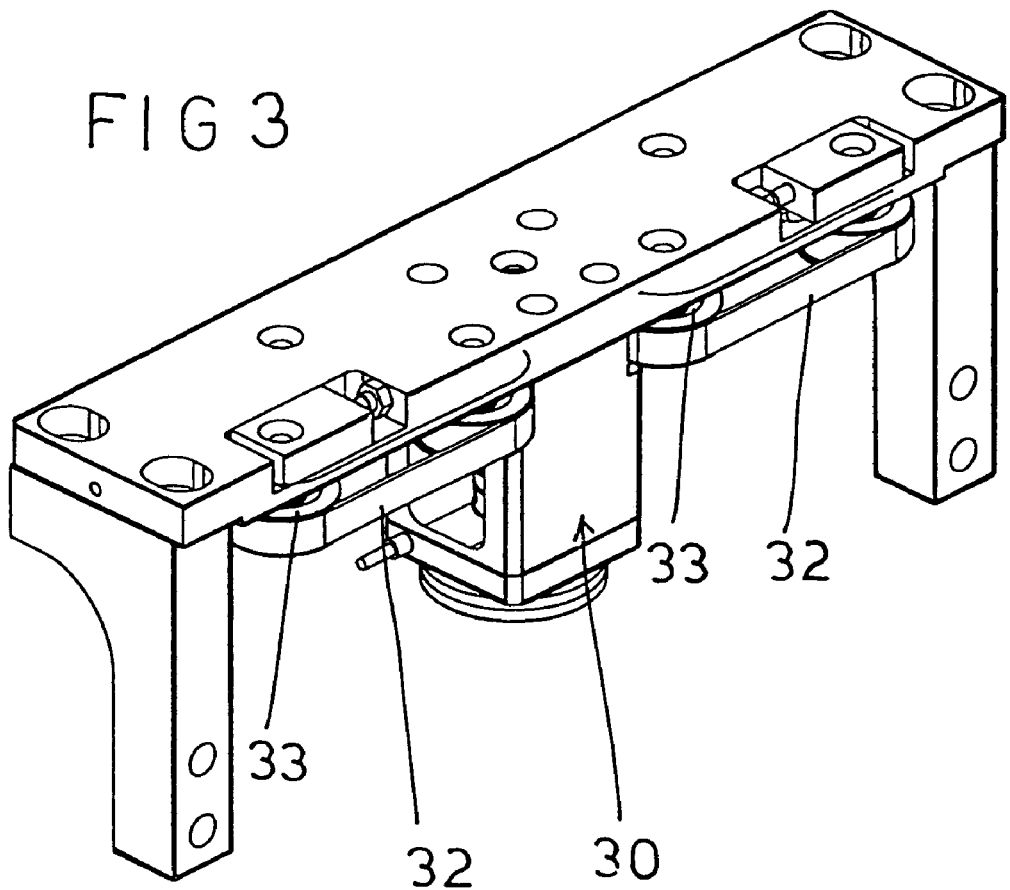
FIG. 3 is a perspective view showing a control encoder for controlling the movements of the subject endless chain.
Figure 4:
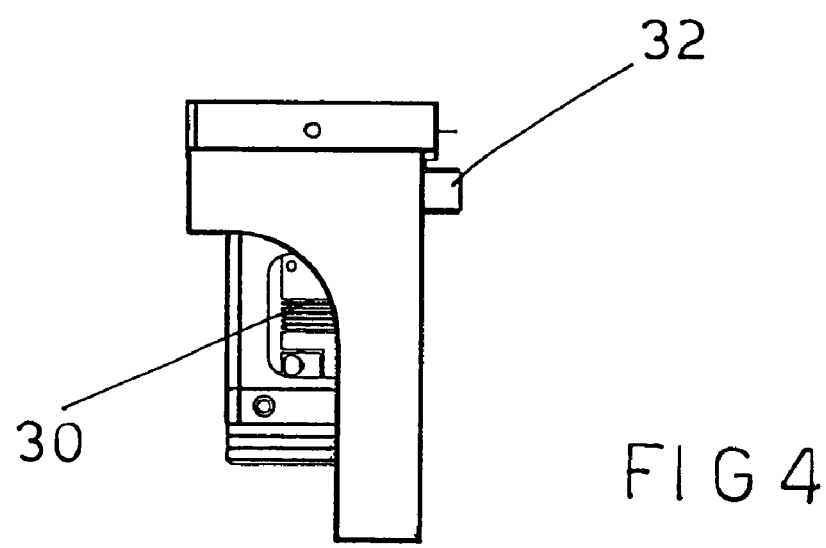
FIG. 4 is an end view showing the control encoder.
Figure 5:
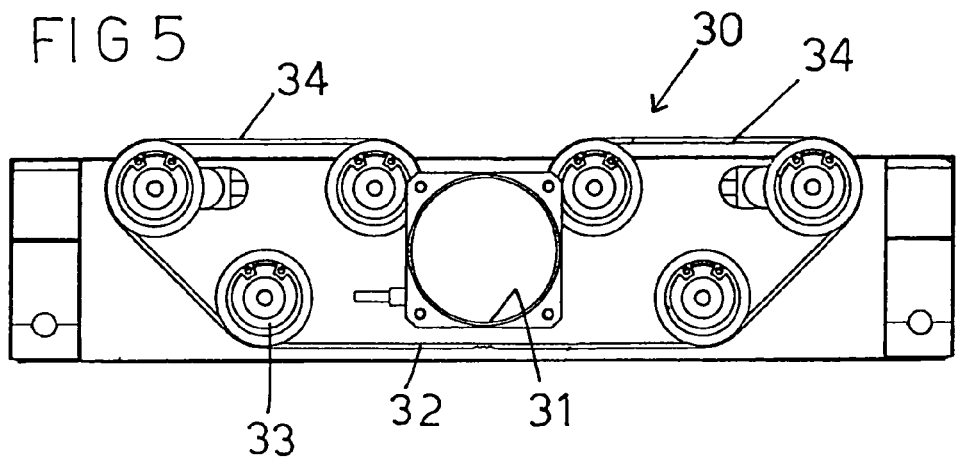
FIG. 5 is a bottom view showing the control encoder.
Figure 6:
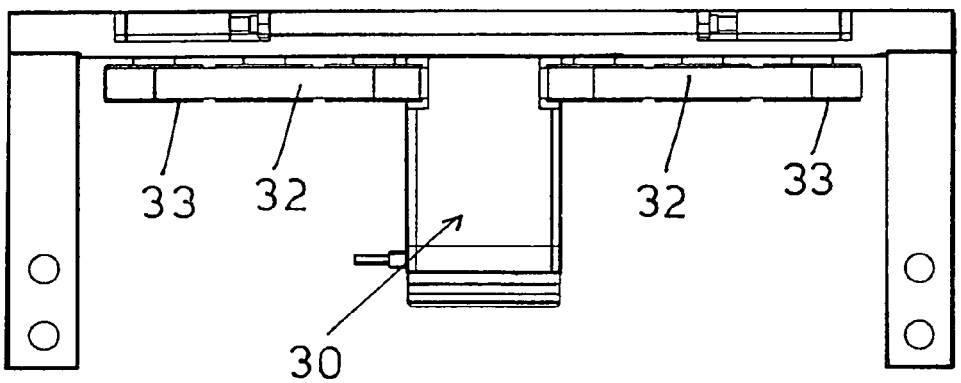
FIG. 6 is an elevation view showing the control encoder.
Figure 7:
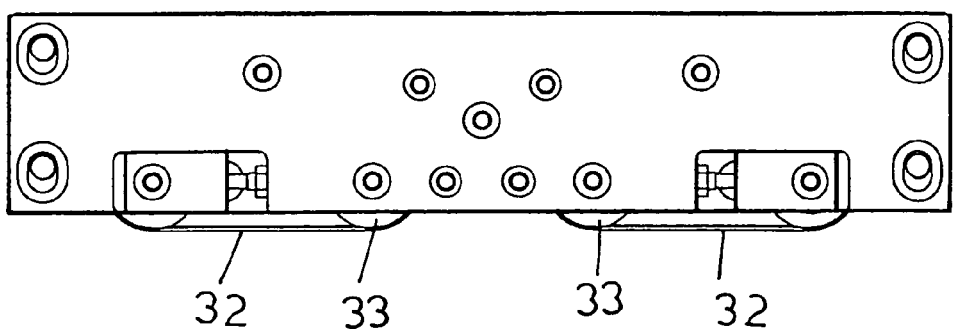
FIG. 7 is a top plan view showing the control encoder.
Figure 8:
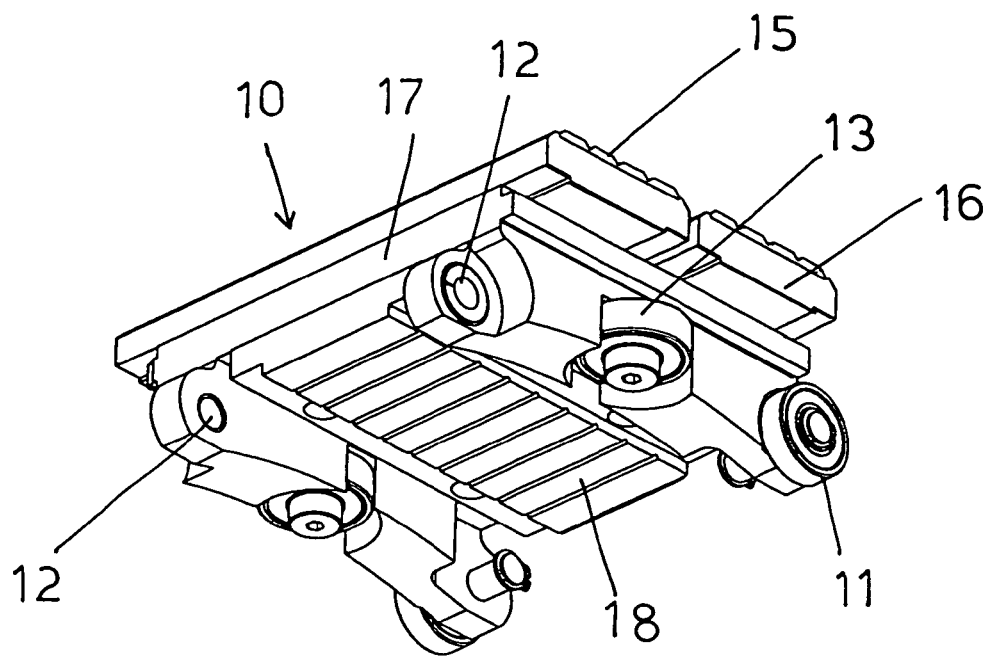
FIG. 8 is a schematic bottom perspective view showing a link of the endless link chain according to the invention.
Figure 9:
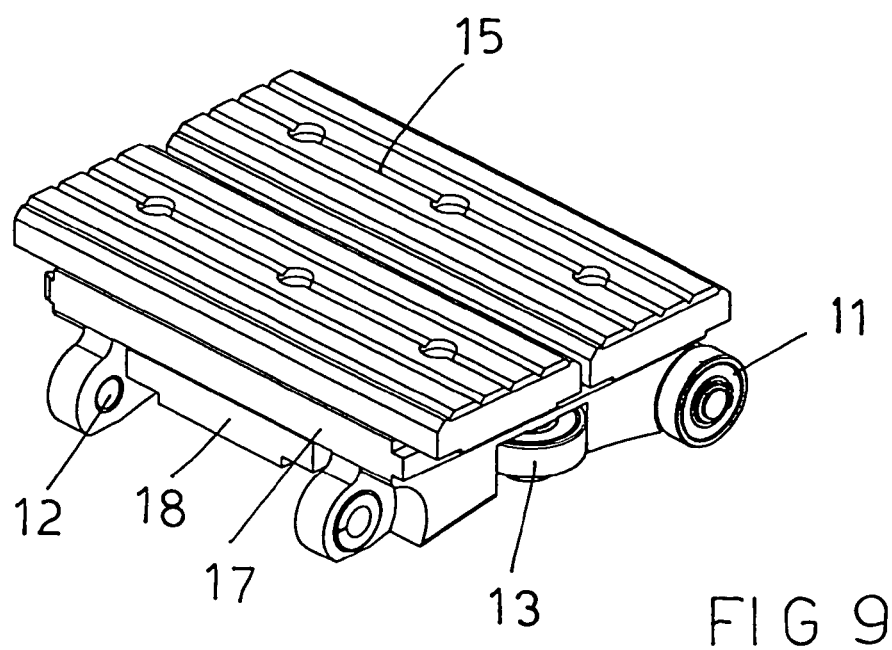
FIG. 9 is a top perspective view showing a link of the endless link chain according to the invention.
Figure 10:
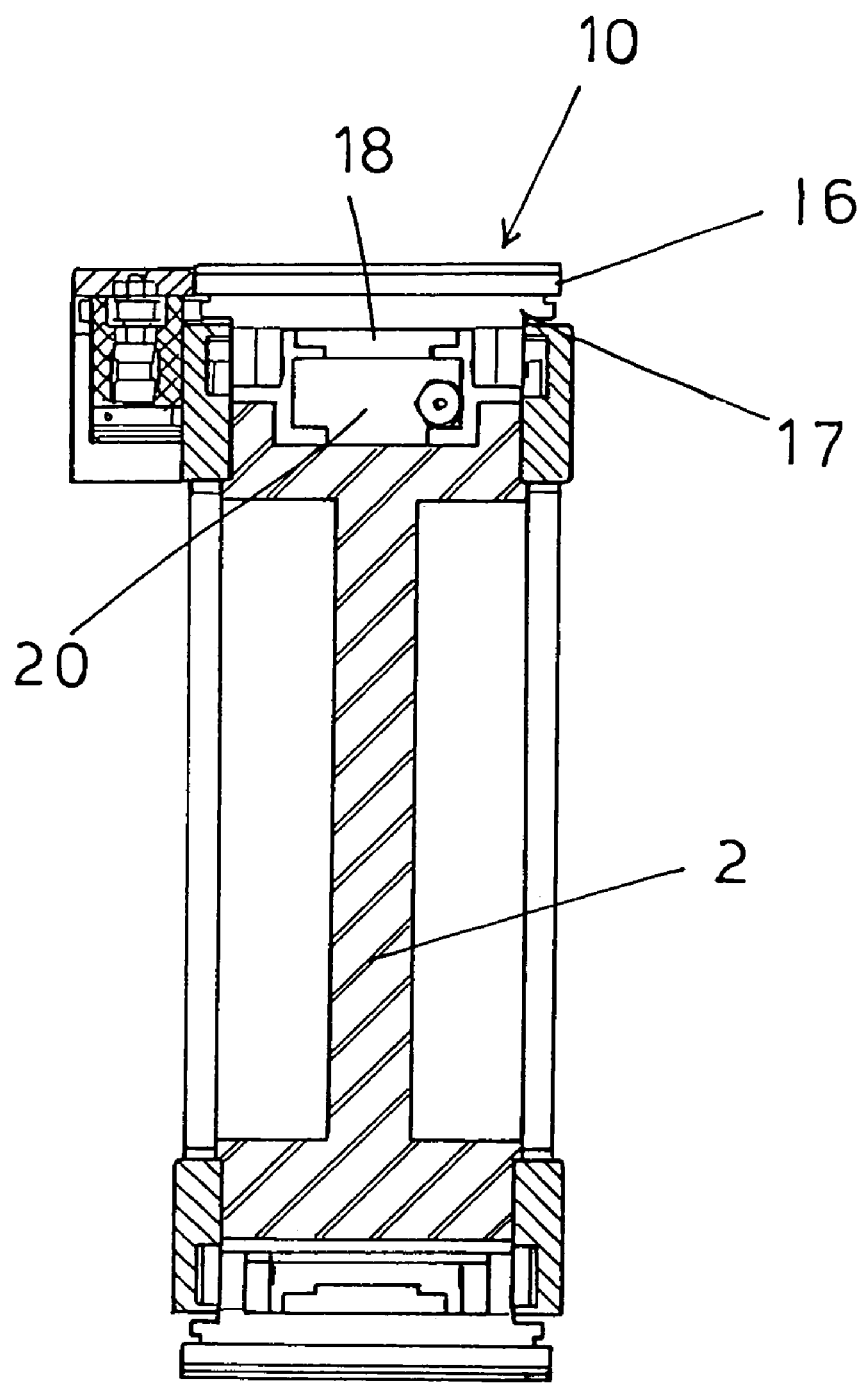
FIG. 10 shows a cross-sectional view substantially taken along the section line X-X of FIG. 1.
Figure 11:
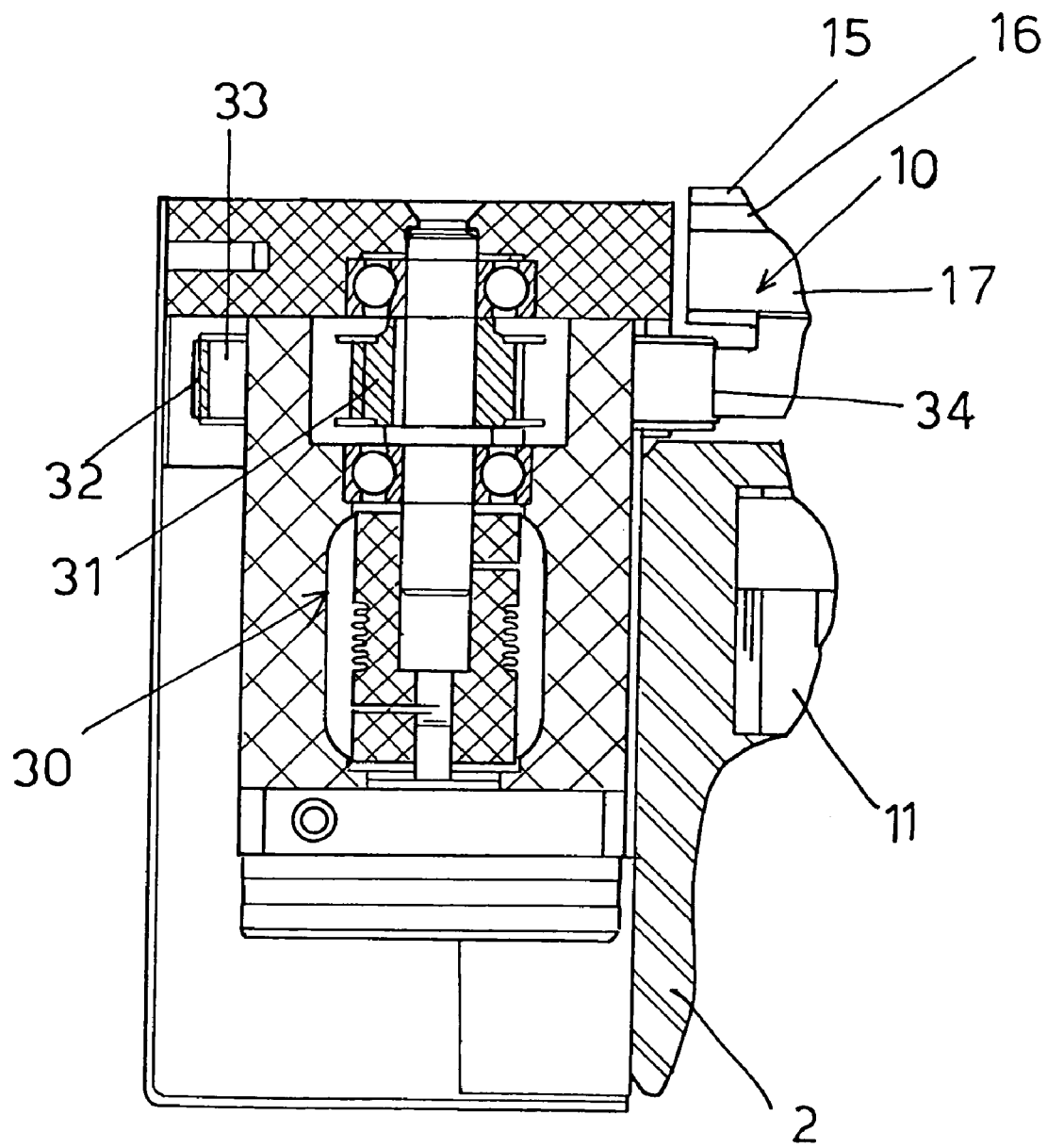
FIG. 11 shows, on an enlarged scale, a further cross-sectional view of the endless chain, substantially taken at the control encoder.

With reference to the number references of the above mentioned figures, the endless chain for conveying panels and the like to be processed, according to the present invention, comprises an endless link chain 1, entrained, in an endless pattern, on a framework which has been generally indicated by the reference number 2.

The endless chain 1 comprises a plurality of chain links 10, having a pair of horizontal-axis roller bearings 11, which are arranged on a respective chain link 10 on the opposite side of the pivot eyes 12 for pivoting each link to an adjoining link.

At a middle portion of the endless link chain a plurality of vertical axis stabilizing bearings 13 allowing the endless link chain to be driven with an optimum driving pattern are provided.

As shown, each chain link comprises a rubber top layer 15, operating as a friction element, applied on aluminum rods 16, in turn coupled to the bearing construction 17 which, at a bottom part thereof, comprises a magnet 18 arranged between said rollers and extending in the link displacement or driving direction.

A main feature of the invention is that the endless link chain is driven by a linear motor 20 cooperating with the permanent magnets 18 which practically operate as a movable parts of the linear motor.

Said linear motor, according to the invention, is controlled by a rotary control encoder 30 including a toothed pulley 31 meshing with a toothed belt 323 the teeth of which are outward directed and being entrained on a plurality of idle rollers 33, thereby providing linear path portions 34 engaging with the side walls of the chain link construction 17, thereby allowing to perfectly control the driving of the chain.

In actual practice, said control encoder will control the linear motor, to provide very accurate and high speed displacements of the chain, since the link body, being provided with a permanent magnet, directly cooperates with said linear motor which, accordingly, will always provide a very simple and quick driving of the chain.

From the above disclosure it should be apparent that the invention fully achieves the intended aim and objects.

Actually, the invention provides a driving chain for driving panels and the like to be processed, in which, owing to the provision of the control encoder driving the linear motor, it is possible to provide a very accurate working due to the great accuracy and high speed of the chain displacements.

The invention, as disclosed, is susceptible to several modifications and variations, all of which will come within the scope of the invention.

Moreover, all the constructional details can be replaced by other technically equivalent elements.

In practicing the invention, the used materials, as well as the contingent size and shapes, can be any, depending on requirements.

The invention claimed is:

1. An endless chain for conveying panels to be processed, said endless chain comprising an endless link chain including a plurality of adjoining mutually coupled chain links, each chain link having chain link sidewalls and chain link articulating eyes, said endless link chain being coupled to and driven by a linear motor for driving said endless link chain, wherein said linear motor is controlled by a control rotary encoder, wherein said control rotary encoder rotatively drives a toothed pulley meshing with a toothed belt having a plurality of outward directed toothed belt teeth, and being entrained on a plurality of idle rollers thereby providing linear path portions engaging with said chain link sidewalls, wherein each said chain links comprises a pair of horizontal axis roller bearings opposite to said articulating eye means and vertical axis stabilizing bearings arranged at a middle portion of said endless link chain, and wherein each said chain link comprises a permanent magnet forming a movable part of said linear motor.

2. An endless chain, according to claim 1, wherein each said chain link comprises a working surface coated by a rubber coating friction layer operating as a friction member and coating aluminum rods coupled to each said chain link.

* * * * *